United States Patent [19]

Knapp et al.

[11] 4,247,128
[45] Jan. 27, 1981

[54] BELLOWS CONNECTION BETWEEN FRONT AND REAR SECTION OF A JOINTED BUS

[75] Inventors: Jost Knapp; Gerhard Sawall, both of Sindelfingen, Fed. Rep. of Germany

[73] Assignee: Daimler-Benz Aktiengesellschaft, Fed. Rep. of Germany

[21] Appl. No.: 20,347

[22] Filed: Mar. 14, 1979

[30] Foreign Application Priority Data

Mar. 14, 1978 [DE] Fed. Rep. of Germany ....... 2810900

[51] Int. Cl.³ .............................................. B60D 5/00
[52] U.S. Cl. ..................................... 280/403; 105/18
[58] Field of Search ..................... 105/1 R, 15, 18, 19, 105/20–21; 280/403, 424

[56] References Cited

FOREIGN PATENT DOCUMENTS

| | | |
|---|---|---|
| 207698 | 2/1960 | Austria ................................. 280/403 |
| 1164246 | 2/1964 | Fed. Rep. of Germany ........... 280/403 |
| 1195617 | 6/1965 | Fed. Rep. of Germany ........... 280/403 |
| 1207220 | 12/1965 | Fed. Rep. of Germany ........... 280/403 |
| 1211075 | 2/1966 | Fed. Rep. of Germany ........... 280/403 |
| 1211076 | 2/1966 | Fed. Rep. of Germany ........... 280/403 |

*Primary Examiner*—Robert R. Song
*Assistant Examiner*—Norman L. Stack
*Attorney, Agent, or Firm*—Craig & Antonelli

[57] ABSTRACT

A bellows connection adapted to be disposed between a front and rear section of an articulated vehicle. The bellows connection includes a first and second bellows part with at least one of the bellows parts being mounted on an end frame of one of the sections of the articulated vehicle. Both of the bellows parts are connected to each other by a portal-like bellows yoke which is saddled-mounted to the front section in a ball joint at the bottom so that it is omnidirectionally pivotable. A lemniscate control arrangement is provided for guiding the bellows yoke along a bisecting line of a bending angle between the front and rear sections of the vehicle. To provide for additional guidance and support of the bellows yoke two struts are provided in a roof area of the vehicle in a vicinity of the central longitudinal axis thereof. The struts are articulated to the front or rear sections of the vehicle and to the bellows yoke. An arm which extends cross wise to the length of the vehicle is provided in a lower area of the vehicle with the arm being articulated at one end in a vicinity of the central longitudinal axis of the vehicle on a part of the front section which is integral with the vehicle. The other end of the arm is articulated to the bellows yoke.

8 Claims, 4 Drawing Figures

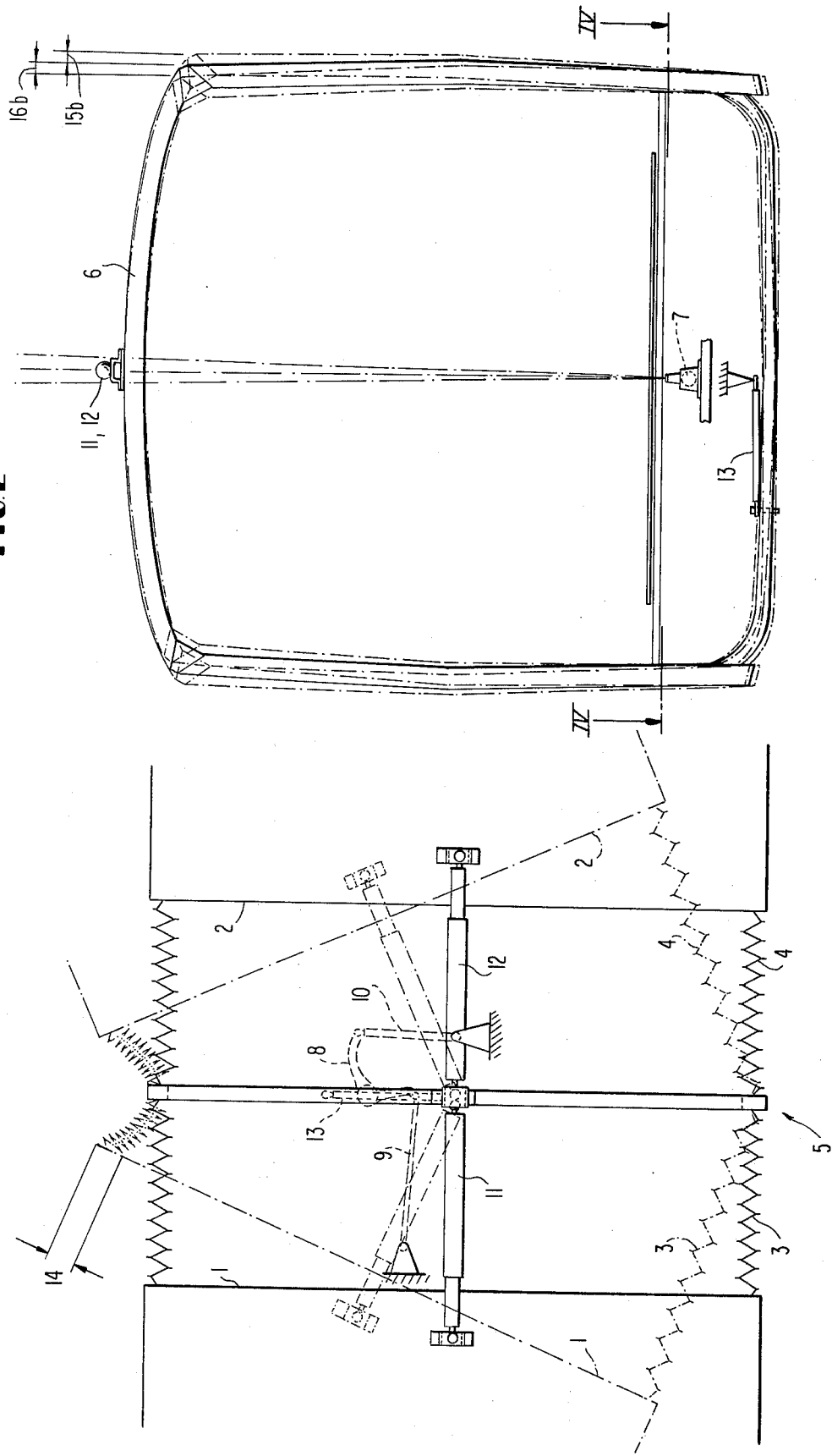

BELLOWS CONNECTION BETWEEN FRONT AND REAR SECTION OF A JOINTED BUS

The present invention relates to a connection arrangement and, more particularly, to a bellows connection adapted to be disposed between front and rear body sections of an articulated vehicle such as, for example, a bus, with the bellows connection including two bellows parts at least one of which is fastened to an end frame of one of the body sections with both bellows parts being connected by a portal-like bellows yoke which is saddle-mounted to the forward body section and held at a bottom area thereof in an omnidirectional pivotable manner by a ball joint, and with, for example, a lemniscate control whereby the bellows yoke is guided on a bisecting line of a bending angle between the front and rear body sections of the articulated vehicle.

A plurality of telescoping arms in the form of struts may be provided in a roof area of the vehicle for additional guidance of the bellows yoke. The struts may be articulated at one end on the vehicle and at the other end on the bellows yoke. Bellows connection arrangements have been proposed wherein four struts are disposed diagonally, or, for example, in German Pat. No. 966,303, two struts are provided which extend or run in a direction of the central longitudinal axis of the articulated vehicle.

A disadvantage of the proposed arrangements reside in the fact that, when the articulated vehicle is traveling around a curve, an area of the bellows on the inside of the curve, which is then subjected to very high stress, is also subjected to a force directed toward the outside of the curve with the forces resulting in an additional deforming stress on the bellows. The additional deforming stress results in a premature wear phenomena in the bellows.

The aim underlying the present invention essentially resides in providing a bellows connection for connecting two sections of an articulated vehicle wherein the bellows are controlled in such a manner that the work of deformation during travel around curves as well as additional pitching movements such as a curve when traversing ramps, bumps, or the like, is maintained as low as possible thereby increasing the lifetime of the bellows and contributing to the greater overall economy of the operation of the articulated vehicle.

In accordance with the present invention, two strut means are provided for the further guidance and support of the bellows yoke with the two strut means being provided in the roof area of the articulated vehicle. The strut means run in the vicinity of a central longitudinal axis of the articulated vehicle and are articulated or pivotably connected to the front or rear body section of the vehicle and to the bellows yoke with an arm being provided in a lower area of the bellows which arm runs in a direction extending at right angles to a longitudinal axis of the articulated vehicle. The arm is articulated at one end in a vicinity of the central longitudinal axis to a portion of the front body section which is integral with the vehicle with the other end of the arm being articulated to the bellows yoke.

Accordingly, it is an object of the present invention to provide a bellows connection for an articulated vehicle which avoids, by simple means, shortcomings and disadvantages encountered in the prior art.

Another object of the present invention resides in providing a bellows connection for an articulated vehicle which minimizes, if not avoids, the occurrence of premature wear in the bellows.

A still further object of the present invention resides in providing a bellows connection for an articulated vehicle which minimizes the occurrence of deforming stress on the bellows as well as minimizes the occurrence of additional pitching movements of the bellows.

Yet another object of the present invention resides in providing a bellows connection for an articulated vehicle which is simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention, and wherein:

FIG. 1 is a partially schematic top plan view of a bellows connection in accordance with the present invention arranged between two sections of an articulated vehicle with the phantom lines indicating a position of the bellows connection during a travel of the vehicle around a tight curve;

FIG. 2 is a partially schematic frontal view of the bellows connection of FIG. 1.

Figure 3:
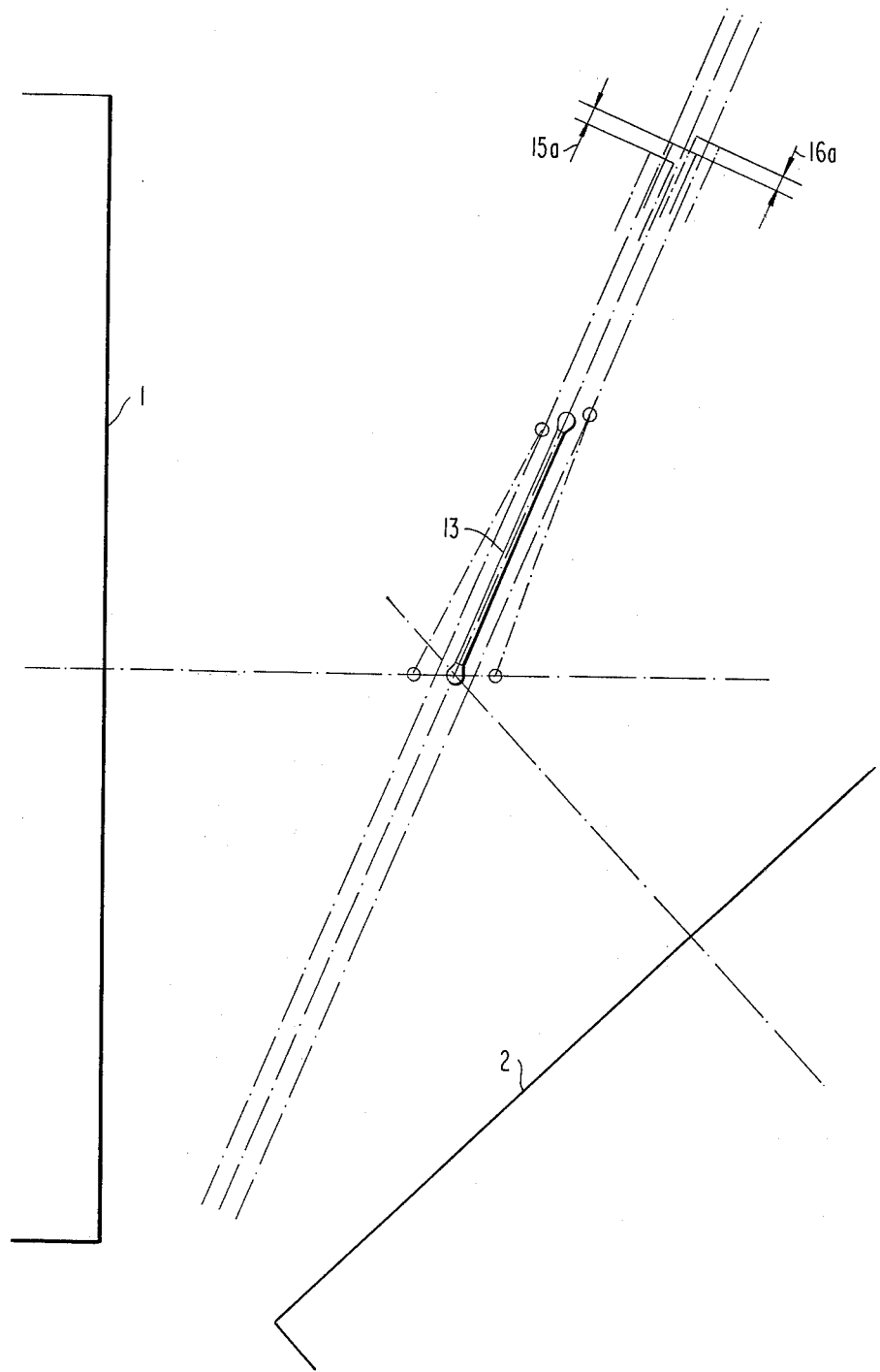
FIG. 3 is a partially schematic top view of the bellows connection of FIG. 1 illustrating a positioning of a lower cross arm of the present invention when the articulated vehicle rounds a curve.

Referring now to the drawings wherein like reference numerals are used throughout the various views to designate like parts and, more particularly, to FIGS. 1 and 2, according to these figures, a schematically illustrated articulated vehicle, such as, for example, a passenger bus or the like, includes a front body section 1 and a rear body section 2 which are connected together by way of a bellows generally designated by the reference numeral 5. The bellows 5 includes a first bellows part 3 and a second bellows part 4 each having a first end respectively connected to the front and rear body sections 1, 2 with a portal-like bellows yoke 6 being provided to connect the free ends of the two bellows parts 3, 4. The bellows yoke 6 is saddle-mounted in a ball joint 7 (FIG. 2) provided on the front body section 1 so as to be omnidirectionally moveable.

Figure 4:
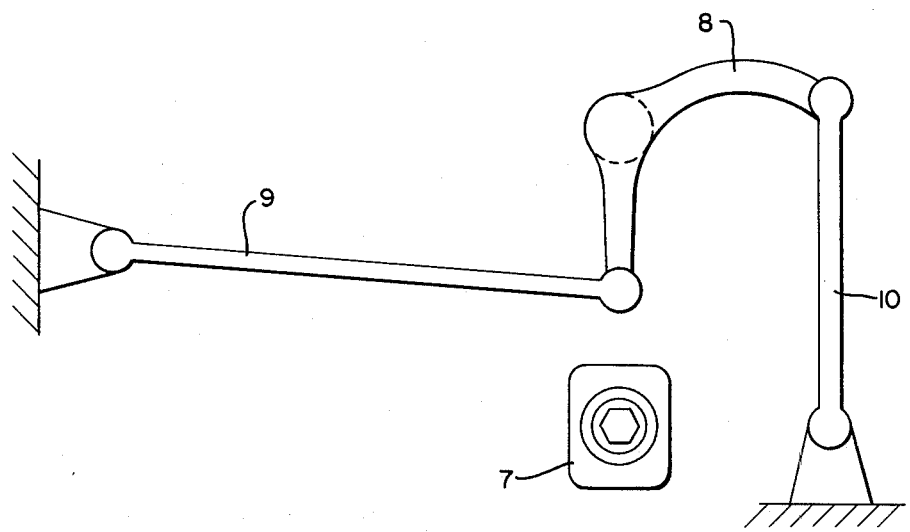
FIG. 4 is a partially schematic view of the lemniscate control arrangement according to line IV—IV of FIG. 2.

A lemniscate control arrangement is provided to guide the bellows yoke 6 on a bisecting line of a bending angle between the front body section 1 and the rear body section 2. The lemniscate control arrangement includes a two-armed lever 8 articulated on the bellows yoke 6, a lever 9, articulated to the front body section 1 and to one free end of the two-armed lever 8, and an arm 10 articulated to the other free end of the two-armed lever 8 and with the rear body section 2. The lemniscate control arrangement is disposed at a level of the ball joint 7 of FIG. 2; The lemniscate control arrangement is enlarged in FIG. 4 for greater clarity.

Two struts 11, 12 are formed as telescopic members or string struts are provided in a roof area of the articulated vehicle for additional guidance and support of the bellows yoke 6 with the struts 11, 12 extending in a direction of the central longitudinal axis of the articulated vehicle. Each one of the struts 11, 12 have one free end articulated in a common point on the bellows yoke 6 with the other free end of the strut 11 being articulated on the front body section 1 and the other free end of the strut 12 being articulated on the rear body section 2. The struts 11, 12 assure that when the articulated vehicle rounds a curve, a force directed toward an inside of the curve is exerted on an area of the bellows 5 which is on the inside of the curve thereby relieving the load on the bellows 5.

An improved guidance of the bellows yoke 6 may be achieved by employing a lower cross arm 13 disposed below the lemniscate control arrangement. The lower arm 13 is articulated at one end on the bellows yoke 6 and at the other end on a fixed part of the front body section 1 below the ball joint 7. This construction ensures that an exact guidance without pitching of the bellows yoke 6 in a direction at right angles to the length of the articulated vehicle when the vehicle is rounding a curve.

If the articulated vehicle is subjected to additional pitching when traversing, for example, slopes, bumps, or the like, the bellows yoke 6 is tilted sideways by the cross arm 13 so that a displacement 14 (FIG. 1) of the bellows 5, caused by a circular movement of the bellows yoke 6, is reduced in the critical areas. Additionally, struts 11, 12 cause further crosswise displacement in the critical areas to the extent permitted by the elasticity of the bellows yoke 6.

FIG. 3 provides an illustration of the displacement of the bellows yoke 6 caused by the cross arm 13 as the front and rear body sections 1, 2 of the articulated vehicle "pitch up" and "pitch down". The term "pitch down" refers to travel of the articulated vehicle over a depression; whereas, the "pitch up" refers to travel of the articulated vehicle over a bump.

When the vehicle "pitches down", the bellows yoke 6 is displaced downward by a distance designated 15a toward an outside of the curve and a distance designated 15b at the top toward the inside of the curve. When the articulated vehicle "pitches up", the corresponding displacement of the bellows yoke 6 occurs in the opposite direction, that is, by the distance 16a at the bottom toward the inside of the curve and by the distance designated 16b at the top toward the outside of the curve, thereby once again resulting in an easing or dissipation of the load on the critical areas of the bellows 5.

While we have shown and described only one embodiment in accordance with the present invention, it is understood that the same is not limited thereto, but is suseptile of numerous changes and modifications as known to one having ordinary skill in the art, and we therefore do not wish to be limited to the details shown and described herein, but intend to cover all such modifications as are encompassed by the scope of the appended claims.

We claim:

1. A bellows connection adapted to be disposed between a front body section and a rear body section of an articulated vehicle, the bellows connection including two bellows parts each having a first end operatively connected to a respective body section of the articulated vehicle and a free end, and a portal-like bellows yoke means for connecting the respective free ends of the two bellows parts to each other, means are provided for guiding and supporting the bellows yoke means including a pair of strut means arranged in a roof area of the articulated vehicle, means are provided for operatively connecting the respective strut means to the respective body sections and to the bellows yoke means, further means are provided for additionally guiding the bellows yoke means, the further means being disposed in a lower area of the bellows yoke means and extending in a direction transverse to a length of the articulated vehicle, and in that means are provided for operatively connecting said further means with one body section of the articulated vehicle and with the bellows yoke means, lemniscate control means are provided including a two-armed lever articulated on the bellows yoke and having free ends, and means for operatively connecting the respective free ends of the two-armed lever to the front body section and the rear body section, whereby the lemniscate control means guides the bellows yoke means in a direction substantially transverse to a length of the articulated vehicle when the front body section and rear body section are disposed in a straight alignment and guides the bellows yoke means on a bisecting line of a bending angle between the front body section and rear body section of the articulated vehicle when the front body section and rear body section are disposed at an angle with respect to each other.

2. A bellows connection according to claim 1, characterized in that the further means includes a cross arm having a first end and a second end, and in that said means for operatively connecting said further means with the vehicle and the bellows yoke means includes a pivot joint means for connecting the first end of the cross arm with a portion of the body section in a vicinity of a central longitudinal axis of the articulated vehicle, and a further pivot joint means for connecting the second end of the cross arm with the bellows yoke means.

3. A bellows connection according in claim 2, characterized in that a ball joint means is provided for saddlemounting the bellows yoke means to the front body section so as to permit the bellows yoke means to be omnidirectionally pivotable.

4. A bellows connection according to claim 3, characterized in that the cross arm is operatively connected to the articulated vehicle and the bellows yoke means at a position below the ball joint means.

5. A bellows connection according to claim 4, characterized in that the first end of the cross arm is connected to an integral portion of the front body section of the articulated vehicle.

6. A bellows connection according to claim 5, characterized in that the strut means are disposed in the roof area in a vicinity of the central longitudinal axis of the articulated vehicle.

7. A bellows connection according to one of claims 1, 2, 3, 4, 5, or 6 characterized in that the means for operatively connecting the strut means to the respective body sections and to the bellows yoke means includes joint means for connecting a first end of one of the strut means with the front body section, joint means for connecting a first end of the other strut means with the rear body section, and joint means for connecting second ends of the two strut means for each other and to the bellows yoke means, and in that the strut means are disposed in the roof area of the articulated vehicle in a vicinity of a central longitudinal axis of the articulated vehicle.

8. A bellows connection according to claim 7, characterized in that the two strut means are connected to the bellows yoke means along a common vertical axis of the bellows yoke means.

* * * * *